US008682041B2

(12) United States Patent
McCloskey

(10) Patent No.: US 8,682,041 B2
(45) Date of Patent: Mar. 25, 2014

(54) RENDERING-BASED LANDMARK LOCALIZATION FROM 3D RANGE IMAGES

(75) Inventor: Scott McCloskey, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 384 days.

(21) Appl. No.: 13/016,448

(22) Filed: Jan. 28, 2011

(65) Prior Publication Data

US 2012/0194504 A1 Aug. 2, 2012

(51) Int. Cl.
*G06K 9/00* (2006.01)

(52) U.S. Cl.
USPC ............ 382/118; 345/420; 382/154; 382/203

(58) Field of Classification Search
USPC ........... 345/419, 420; 382/118, 154, 203, 294
See application file for complete search history.

(56) References Cited

U.S. PATENT DOCUMENTS

| 6,580,811 | B2 * | 6/2003 | Maurer et al. | 382/103 |
|---|---|---|---|---|
| 6,714,661 | B2 | 3/2004 | Buddenmeier et al. | |
| 6,714,665 | B1 * | 3/2004 | Hanna et al. | 382/117 |
| 6,954,202 | B2 * | 10/2005 | Han et al. | 345/419 |
| 7,065,232 | B2 * | 6/2006 | Geng | 382/115 |
| 7,292,737 | B2 * | 11/2007 | Zhou et al. | 382/294 |
| 7,454,039 | B2 * | 11/2008 | Tu et al. | 382/115 |
| 7,643,671 | B2 | 1/2010 | Dong et al. | |
| 8,401,248 | B1 * | 3/2013 | Moon et al. | 382/118 |
| 2005/0036690 | A1 * | 2/2005 | Zhou et al. | 382/203 |
| 2006/0132486 | A1 * | 6/2006 | Kim et al. | 345/420 |
| 2008/0212849 | A1 * | 9/2008 | Gao | 382/118 |
| 2009/0132371 | A1 * | 5/2009 | Strietzel et al. | 705/14 |
| 2009/0185746 | A1 * | 7/2009 | Mian et al. | 382/209 |
| 2010/0246980 | A1 * | 9/2010 | Tong et al. | 382/228 |
| 2011/0075916 | A1 * | 3/2011 | Knothe et al. | 382/154 |
| 2011/0080402 | A1 * | 4/2011 | Netzell et al. | 345/420 |
| 2012/0194504 | A1 * | 8/2012 | McCloskey | 345/419 |

OTHER PUBLICATIONS

Harris, J. G., et al., "Nonuniformity correction using the constant-statistics constraint: analog and digital implementations [for IR FPA]", Proceedings of the SPIE—The International Society for Optical Engineering, v 3061, (1997), 895-905.

Zhou, Jinda, et al., "Histograms of Categorized Shapes for 3D ear detection", Fourth IEEE International Conference on Biometrics: Theory Applications and Systems (BTAS), 2010, (2010), 1-6.

"European Application Serial No. 12152484.7, European Search Report mailed Jul. 19, 2012", 3 pgs.

"European Application Serial No. 12152484.7, Office Action mailed Aug. 7, 2012", 5 pgs.

(Continued)

*Primary Examiner* — Gregory M Desire
(74) *Attorney, Agent, or Firm* — Schwegman, Lundberg & Woessner, P.A.

(57) ABSTRACT

A computer implemented method comprising acquiring a three-dimensional (3D) range image containing one or more 3D landmarks; rendering the 3D range image into a rendered visible image containing intensity patterns related to the one or more 3D landmarks; and localizing at least one of the one or more 3D landmarks in the rendered visible image to provide at least one localized 3D landmark. is provided. Such methods, and related systems, and devices, are useful in biometric identification applications.

23 Claims, 4 Drawing Sheets

(56) References Cited

OTHER PUBLICATIONS

Gao, Y., et al., "Automatic construction of 3D animatable facial avatars", *Comput. Animat. Virtual Worlds*, 21(3-4), (2010), 343-354.
Vaillant, M., "Computational Anatomy for Generating 3D Avatars and Boosting Face Recognition Systems", *IEEE Computer Society Conference on Computer Vision and Pattern Recognition—Workshops*, 2005. CVPR Workshops, (2005), 1-7.
Zhang, Yu, et al., "Rapid modeling of 3D faces for animation using an efficient adaptation algorithm", *Proceedings of the 2nd International Conference on Computer Graphics and Interactive Techniques in Australasia and South East Asia*, (2004), 173-181.
"European Application Serial No. 12152484.7, Response filed Feb. 1, 2013 to Examination Notification Art. 94(3) mailed Aug. 7, 2012", 7 pgs.

* cited by examiner

RENDERING-BASED LANDMARK LOCALIZATION FROM 3D RANGE IMAGES

BACKGROUND

Biometric identification is becoming a popular method for access control and for monitoring secure areas, such as airports. In such settings, it is sometimes necessary to compare the image of a person (or some part thereof) to a previously captured "enrollment" image. Several techniques for biometric identification require certain landmarks to be located and their orientations to be estimated automatically.

Much of the past work on biometrics has considered traditional images, namely integrated light in of the visible part of the electromagnetic spectrum. With the increasing availability and decreasing cost of 3D capture devices, however, there is increasing emphasis on biometric identification from the resulting 3D range (i.e., depth) images.

DETAILED DESCRIPTION

Figure 1:
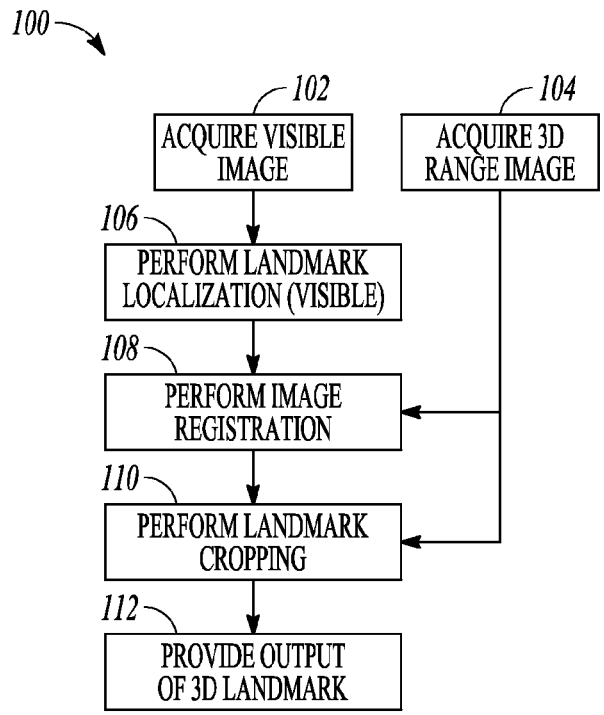
FIG. 1 is a block flow diagram illustrating a prior art landmark localization method.

In the following description, reference is made to the accompanying drawings that form a part hereof, and in which is shown by way of illustration specific embodiments which may be practiced.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Each human face has a number of distinguishable landmarks, including, but not limited to, nose, eye sockets, cheekbones, chin, and the like, each of which have certain characteristics, such as width, shape, etc. When viewed in profile, ears provide highly distinguishable landmarks, as described in J. Zhou, et al., *Histograms of Categorized Shapes for 3D Ear Detection*, 2010 IEEE, http://utopia.csis.pace.edu/cs615/btas2010/BTAS/papers/Paper%20157.pdf, (hereinafter "Zhou") such as is described in section IIA (including in Table 1 and FIG. 3) of Zhou, which is incorporated herein by reference as if fully set forth herein.

Embodiments herein describe a computer implemented method comprising acquiring a three-dimensional (3D) range image containing one or more 3D landmarks; rendering the 3D range image into a rendered visible image containing intensity patterns related to the one or more 3D landmarks; and localizing at least one of the one or more 3D landmarks in the rendered visible image to produce a rendered visible image containing at least one localized intensity pattern related to the at least one 3D landmark. The various methods, and related systems, and devices, are useful in biometric identification applications.

A visible image provides information about the amount of light reflected by objects in a scene, whereas a three-dimensional (3D) image is an image which further provides information related to the distance between the camera and objects in the scene. While a 2.5D image has two dimensions (horizontal and vertical) as well as a pixel value at a particular location which provides distance information, unlike a 3D image, it does not include information on the orientation of the surface of that position, such that both the distance and the angle between the optical axis of the camera and surface normal from the object are known. Although 2.5 D imaging has been utilized in facial recognition technology, it, by definition, contains less information.

Since a 3D range image contains large amounts of data, it has heretofore been difficult to find a particular landmark within the 3D range image, i.e., landmark localization.

FIG. 1, for example, shows a prior art method 100 for localizing landmarks (e.g., an ear) which includes acquiring 102 a traditional visible image (e.g., an RGB visible image of the side of a person's head) in parallel with acquiring 104 a 3D range image or scan (for matching). The 3D range image has pixel values corresponding to distance, i.e., brighter values mean shorter distances, or vice versa. The method continues by performing landmark localization 106 on the visible image to determine a location of a desired landmark in the visible image 102. Since the two images (acquired 3D range image and the localized visible image) are generally not properly aligned, it is necessary to perform a subsequent image registration step (i.e., mapping) 108 between the two images to produce a registered visible image. Image registration 108 is followed by landmark cropping 110 of both the originally acquired 3D range image 104 and the registered visible image from the registration step 108. The result provides the location of the landmark in the 3D image, which is output 112 to a user, i.e., the 3D landmark locations are mapped to the 3D image. This solution is problematic when the registration step 108 between the 3D and visible images is imprecise due to, for example, poor optical alignment between visible and 3D range sensors. It also may be difficult to reconcile the registration since this method requires taking the specific ear location or landmark from the visible image and determining which portion of the 3D image (e.g., of the entire ear) it corresponds to or matches.

Figure 2:
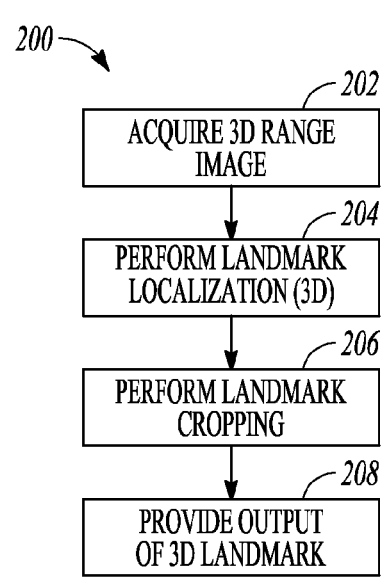
FIG. 2 is a block flow diagram illustrating another prior art landmark localization method.

Other methods have attempted to ignore the visible image altogether, either by not using the acquired image or by not acquiring it initially. (See, for example, Zhou). FIG. 2 shows another prior art method which includes acquiring 202 a 3D range image and performing landmark localization 204. Localization is followed by landmark cropping 206. The result is the location of the landmark in the 3D image, which is output 212 to a user. Existing techniques developed for visible images, such as RGB visible images, are generally not applied here, however, because the characteristics of 3D range images are different than those of visible images. Additionally, as this method essentially requires a custom detector for each particular feature, such as an ear, it is not often used.

In the embodiments described herein, a reductionist approach to landmark localization produces a synthetic or rendered visible image from a 3D range image which is inherently aligned with the 3D range image from which it was produced. As a result, landmark locations found from the rendered visible image are mapped to the 3D image without registration.

Figure 3:
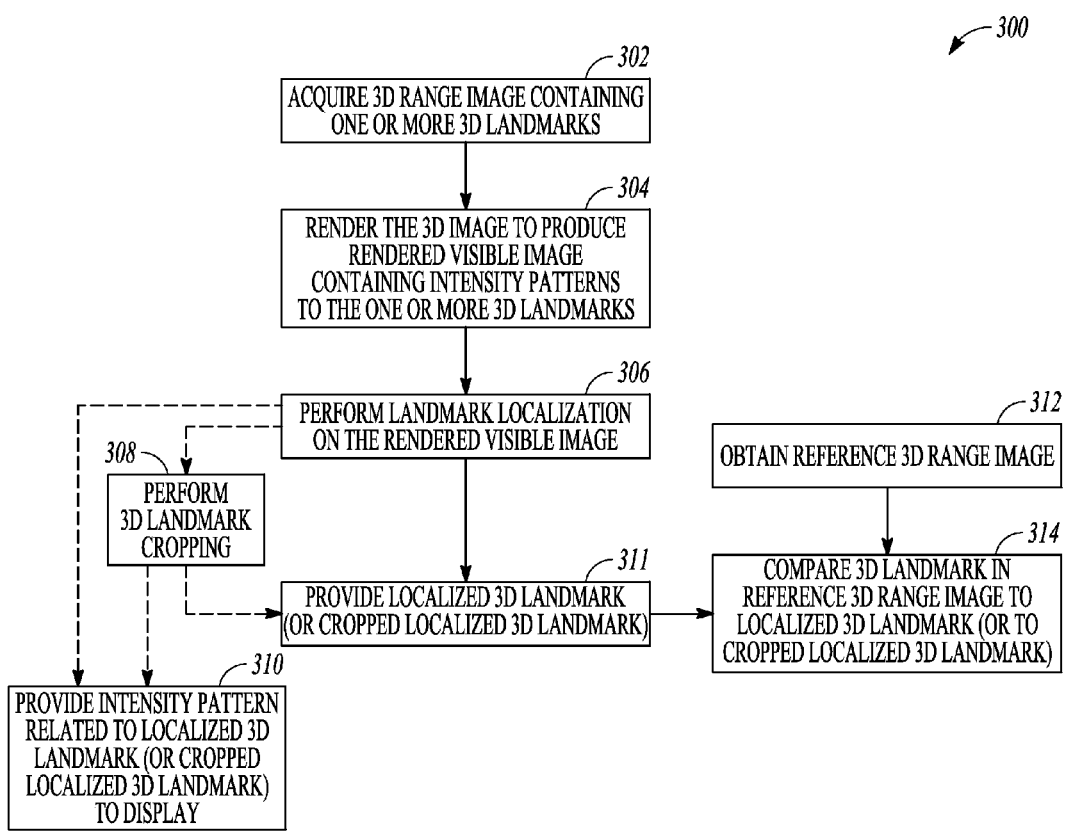
FIG. 3 is a block flow diagram illustrating a landmark localization method from a 3D range image using rendering according to an example embodiment.

FIG. 3 is a flow diagram 300 illustrating an embodiment for outputting a 3D landmark which begins with acquiring 302 a 3D range image containing one or more 3D landmarks. This is followed by rendering 304 of the 3D range image to produce a rendered visible image containing intensity patterns related to the one or more 3D landmarks. (As used herein, a "rendered visible image" is an estimate of the visible image of the same region under specific lighting and models of skin reflectance). Landmark localization is then performed 306 on the rendered visible image, to produce a localized 3D landmark. The method can optionally include landmark cropping 308 to produce a cropped localized 3D landmark. The intensity patterns related to the localized 3D landmark (or cropped localized 3D landmark) can be provided 310 to a display and/or the localized 3D landmark (or cropped localized 3D landmark) can be provided 311 to a processor fur further processing.

In contrast to conventional methods, the novel methods described herein eliminate the need for image registration (as shown in FIG. 1) as well as landmark localization of a 3D range image (as shown in FIG. 2). Instead, a rendered (i.e., synthetic) visible image is produced by rendering the subject in the image in a manner similar to computer graphics.

The method can further include obtaining 312 a reference 3D range image and, in the subsequent processing step, comparing 314 it with the localized 3D landmark (or cropped localized 3D landmark) for purposes of general or biometric identification.

The reference 3D range image can be obtained from any source that can provide prior knowledge of face geometry and symmetry, such as databases created specifically to store a variety of landmarks of various features, such as facial features, from an enrollment image containing landmarks of a particular individual, and the like.

Any suitable type of device can be used to acquire the 3D range image, such as any type of Coded Light Approach (CLA) device. Other devices can include, but are not limited to, LIDAR, laser scanners, stereo cameras, depth from defocus.

As is generally known, typical 3D range images contain artifacts and missing points, primarily over areas that projected light cannot reach and/or over highly refractive or low reflective surfaces. As noted above, the 3D range image has pixel values which correspond to distance, e.g., brighter values mean shorter distances, or vice versa. If properly calibrated, the sensor used to obtain the 3D range image can provide pixel values in physical distance units. In one embodiment, data in the 3D range image is specified or acquired by a metric distance to each pixel location in the image. This is useful when using certain types of systems such as a light detection and ranging (LIDAR) system, i.e., an optical remote sensing technology that measures properties of scattered light to find range and/or other information of a distant target. Most commonly, laser pulses are used to determine distance to an object or surface. Zhou discusses the use of histograms of categorized shapes for 3D object recognition of ears.

In an alternative embodiment, the 3D range image is provided as the orientation of the surface at each pixel location in the image, such as when the 3D range image is acquired as a shape from shading systems. In embodiments in which metric distances are provided, this data can be translated into surface orientations by local differencing.

Rendering of a 3D range image involves generating a two-dimensional (2D) synthetic image from a 3D model or models (i.e., scene file) by means of a computer program. A scene file contains objects in a strictly defined language or data structure as a description of the virtual scene, such as x-y-z coordinates (geometry), translucency, viewpoint, texture, reflectivity information, and so forth. In other words, if the manner in which light would reflect on a particular surface and the local shape of the surface is known, an image can then be produced as to what that surface would have looked like under an arbitrary lighting scheme. In most embodiments a uniform and diffuse lighting is assumed with no harsh shadows (e.g., studio lighting). Shadows and bright reflections can also be taken into account. The manner in which the surface reflects incident light is also taken into account using different shading models for different surfaces. The data contained in the scene file is then passed to a rendering program to be processed and output to a digital image or raster graphics image file.

In one embodiment rendering is performed using commercially available ray tracing packages capable of producing view of a virtual 3D scene on a computer (e.g., such as Persistence of Vision Raytracer (POV-Ray) from Persistence of Vision Raytracer Pty. Ltd., or the like. Rendering can also be performed by other techniques such as scanline or z-buffer rendering. In one embodiment, ray-casting is also used as a hidden-surface removal method to substantially mimic actual physical effects associated with light propagation.

The 3D range image, together with bidirectional reflectance distribution function (BRDF) of the subject in the 3D range image, is used to render the subject's appearance relative to a synthetic light source. (BRDF is a four-dimensional function that defines how light is reflected at an opaque surface). In one embodiment, the BRDF of human skin is used to render a person's appearance relative to a synthetic light source, such as a diffuse light source.

Since landmark localization techniques are applied to the rendered RGB image, the estimated locations correspond precisely to locations in the 3D range images. In one embodiment, a reference skin tone is used without regard to a person's ethnicity. Although useful for general identification purposes (e.g., identifying a member of a particular group), such rendered images are not intended for explicit biometric identification of a particular person, since the general skin model may not be a good match with a given individual's skin characteristics. In one embodiment, a reference skin tone is used to substantially match a person's ethnicity, such as black, white, Asian, and the like. In such embodiments, explicit biometric identification may be performed.

Other subjects reflect incident light differently (e.g., trees, buildings, animals, etc.) and may require a different shading model. In one embodiment a custom application is used, which can hard code human skin BRDF and/or a reference illumination. By restricting the BRDF and/or illumination, a custom application may render the image in less time than commercially available ray tracing packages.

Given the rendered output, traditional RGB techniques for landmark localization can be applied, e.g., using template matching or classification of local features. Given the estimated locations of the necessary landmarks, these locations can map back to the 3D range image, from which the biometric identification may be performed. In one embodiment, the system further comprises a comparing device to perform the biometric identification by comparing the one or more 3D landmarks with one or more 3D landmarks in a reference image.

The novel methods described herein have applicability to a wide range of commercial and law enforcement applications, including, but not limited to, security and access control, surveillance of public places, matching of mug shots, and the like.

In one embodiment, the rendered visible image is a rendered RGB visible image. In one embodiment, the rendered visible image is a rendered black and white (B&W) image or a rendered grayscale image.

Figure 4A:
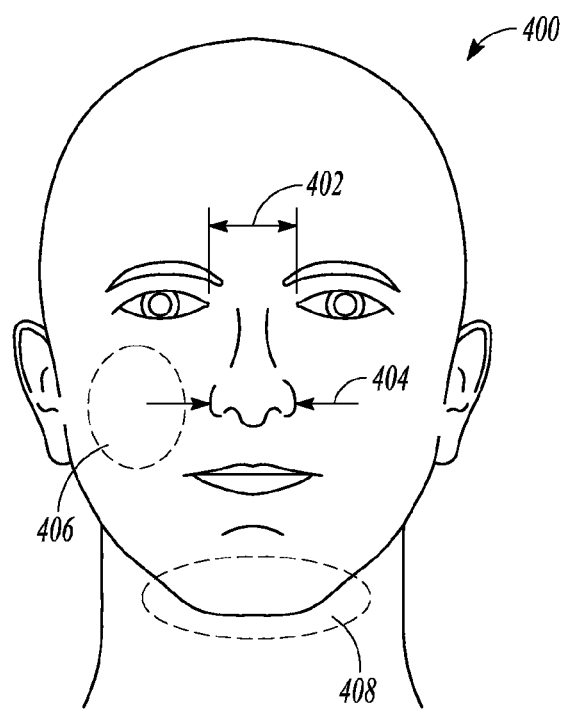
FIG. 4A is a schematic illustration of a rendered visible image of a subject having various 3D facial landmarks according to an example embodiment.
Figure 4B:
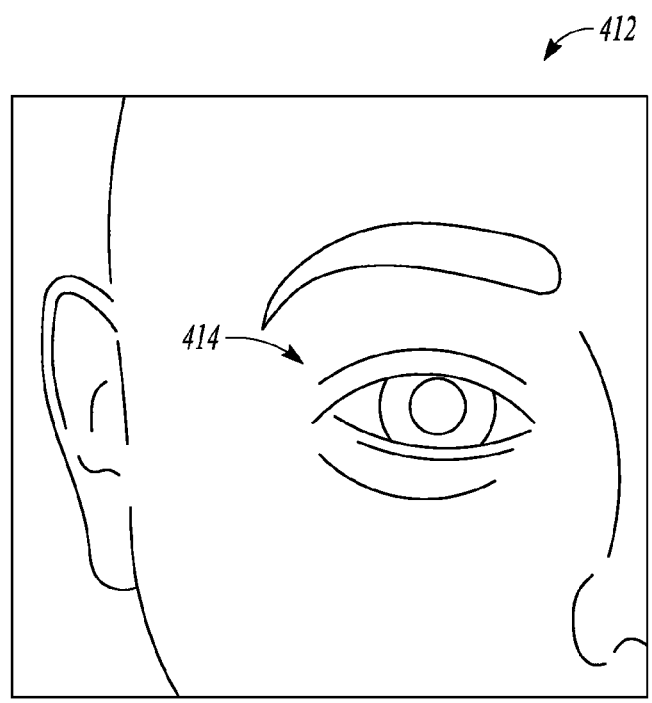
FIG. 4B is a schematic illustration of a rendered visible image of a subject having at least one 3D facial landmark according to an example embodiment.
Figure 5:
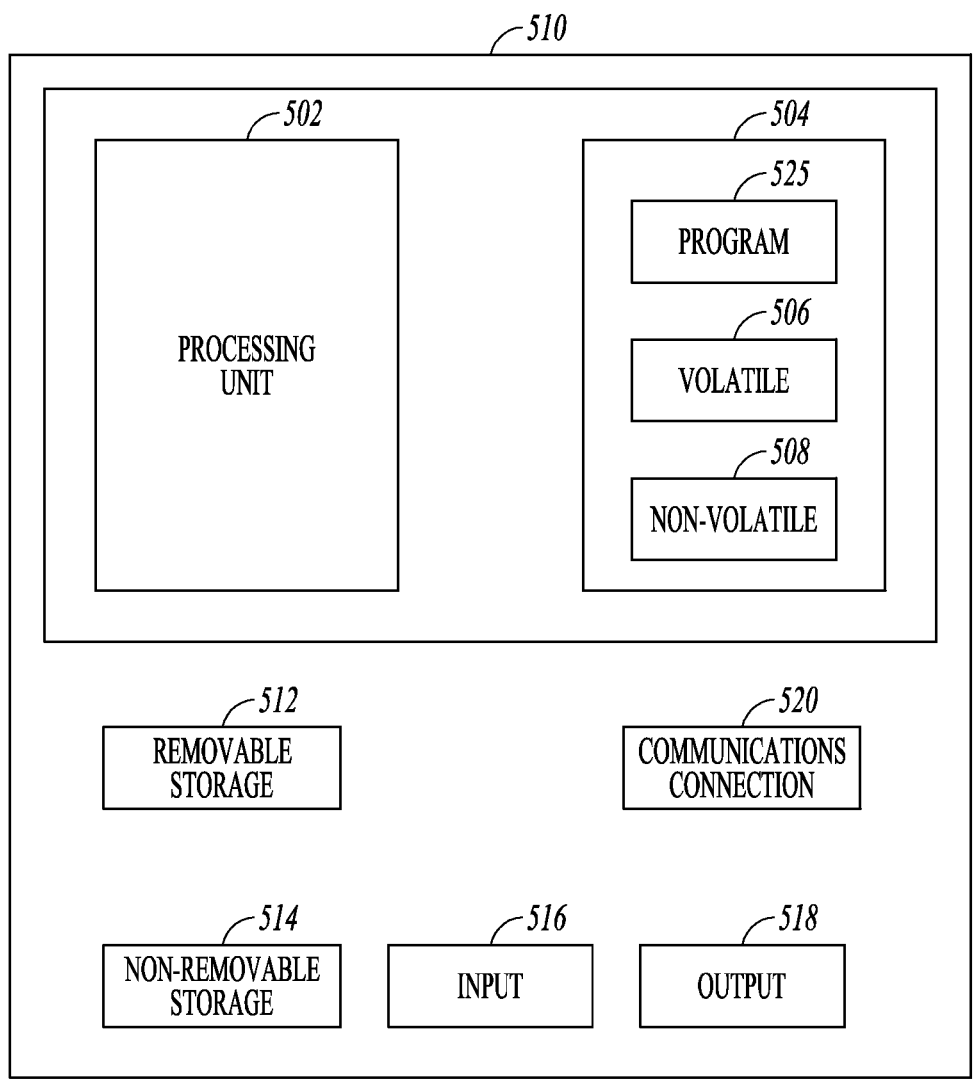
FIG. 5 is a block diagram of a computer system that executes programming for performing methods and procedures regarding landmark localization and rendering according to an example embodiment.

FIG. 4A is a simplified schematic illustration 400 of a subject human face having various landmarks having various characteristics, including, but not limited to, space between eyes 402, width of nose 404, shape of cheekbones 406 and chin features 408. FIG. 4B is a simplified schematic illustration 412 of a subject human eye having an eye socket landmark 414.

Use of the rendering step and omission of registration and attempting landmark localization of a 3D image provides increased simplicity and accuracy in the various embodiments described herein. In contrast, a 2.5D image would not provide suitable rendering since surface orientation for each pixel must be established by taking the derivative of the distance information. If any noise is present, it would be amplified by taking the derivative.

A block diagram of a computer system that executes programming for performing the above algorithms of the diagnostics system is shown in FIG. 4. A general computing device in the form of a computer 410 may include a processing unit 402, memory 404, removable storage 412, and non-removable storage 414. Memory 404 may include volatile memory 406 and non-volatile memory 408. Computer 410 may include, or have access to a computing environment that includes, a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The Abstract is provided to comply with 37 C.F.R. §1.72(b) is submitted with the understanding that it will not be used to interpret or limit the scope or meaning of the claims.

What is claimed is:

1. A computer implemented method comprising:
   acquiring a three-dimensional (3D) range image containing one or more 3D landmarks;
   rendering the 3D range image into a rendered visible image containing intensity patterns related to the one or more 3D landmarks, wherein rendering the 3D range image includes generating a two-dimensional synthetic image from a scene file, and wherein the scene file includes objects in a defined language as a description of a virtual scene; and
   localizing at least one of the one or more 3D landmarks in the rendered visible image to provide at least one localized 3D landmark, wherein the at least one localized 3D landmark is compared with at least one 3D landmark in a reference 3D image to provide a general identification or a biometric identification.

2. The method of claim 1 further comprising cropping the at least one localized landmark to produce an at least one cropped localized 3D landmark.

3. The method of claim 2 further comprising comparing at least one cropped localized 3D landmark with the at least one 3D landmark in the reference image to provide a general identification or a biometric identification.

4. The method of claim 1 wherein the rendered visible image is a rendered visible RGB image.

5. The method of claim 1 wherein the rendered visible image is a rendered visible black and white image or a rendered visible grayscale image.

6. The method of claim 1 wherein the one or more 3D landmarks include facial landmarks.

7. The method of claim 6 wherein the facial landmarks are selected from eyes, nose, cheekbones, chin and ear.

8. The method of claim 1 wherein the 3D range image has a subject and the rendering step comprises utilizing the 3D range image and a bidirectional reflectance distribution function (BRDF) of the subject to render the subject's appearance relative to a synthetic light source.

9. A computer readable device having instructions to cause a computer system to implement a method comprising:
   rendering a 3D range image containing one or more 3D landmarks into a rendered visible image containing intensity patterns related to the one or more 3D landmarks, wherein rendering the 3D range image includes generating a two-dimensional synthetic image from a scene file, and wherein the scene file includes objects in a defined language as a description of a virtual scene;
   localizing at least one of the one or more 3D landmarks to provide at least one localized 3D landmark, wherein the at least one localized 3D landmark is compared with at least one 3D landmark in a reference 3D image to provide a general identification or a biometric identification.

10. The device of claim 9 further comprising cropping the at least one 3D landmark to produce an at least one cropped localized 3D landmark.

11. The device of claim 10 further comprising outputting the at least one localized intensity pattern to a display.

12. The device of claim 10 further comprising comparing at least one cropped localized 3D landmark with the at least one 3D landmark in the reference 3D landmark to provide a general identification or a biometric identification.

13. A system comprising:
 a three-dimensional (3D) range image acquiring device associated with a 3D range image containing one or more 3D landmarks;
 a rendering device configured for rendering the 3D range image into a rendered visible image containing intensity patterns related to one or more 3D landmarks, wherein rendering the 3D range image includes generating a two-dimensional synthetic image from a scene file, and wherein the scene file includes objects in a defined language as a description of a virtual scene; and
 a landmark localization device in communication with the rendering device, the landmark localization device configured to localize at least one of the one or more 3D landmarks in the rendered visible image to provide at least one localized 3D landmark, wherein the at least one localized 3D landmark is compared with at least one 3D landmark in a reference 3D image to provide a general identification or a biometric identification.

14. The system of claim 13 further comprising:
 a cropping device in communication with the landmark localization device to crop the at least one localized 3D landmark to produce at least one 3D landmark; and
 a display in communication with the 3D range image acquiring device to output the at least one localized intensity pattern.

15. The system of claim 14 further comprising a comparing device in communication with the cropping device to compare the at least one cropped localized intensity pattern in the rendered visible image with the at least one 3D landmark in the reference 3D image wherein general identification or biometric identification can be performed.

16. The system of claim 13 wherein the 3D image acquiring device is a Coded Light Approach (CLA) device.

17. The system of claim 13 wherein the 3D acquiring device can provide pixel values of data in the 3D range image in physical distance units.

18. The system of claim 13 wherein the rendering device is a ray tracing device.

19. The system of claim 18 wherein the landmark localization device is also configured to crop the one or more 3D landmarks.

20. The system of claim 13 wherein the rendered visible image is a rendered visible RGB image.

21. The system of claim 13 wherein the rendered visible image is a rendered visible black and white image or a rendered visible grayscale image.

22. The system of claim 13 wherein the one or more 3D landmarks include facial landmarks.

23. The system of claim 22 wherein the facial landmarks are selected from distance between eyes, width of nose, depth of eye sockets, shape of cheekbones, chin features and ear features.

* * * * *